United States Patent
Chen et al.

(10) Patent No.: US 10,699,214 B2
(45) Date of Patent: Jun. 30, 2020

(54) AUTOMATIC IDENTIFICATION AND DEPLOYMENT OF VIRTUAL SENSOR MODELS

(71) Applicant: INTERNATIONAL BUSINESS MACHINES CORPORATION, Armonk, NY (US)

(72) Inventors: Bei Chen, Dublin (IE); Joern Ploennigs, Dublin (IE); Anika Schumann, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 918 days.

(21) Appl. No.: 15/334,821

(22) Filed: Oct. 26, 2016

(65) Prior Publication Data
US 2018/0114140 A1   Apr. 26, 2018

(51) Int. Cl.
| *G06N 20/00* | (2019.01) |
| *G06F 16/28* | (2019.01) |
| *G06F 16/901* | (2019.01) |
| *G06N 5/02* | (2006.01) |

(52) U.S. Cl.
CPC .......... *G06N 20/00* (2019.01); *G06F 16/288* (2019.01); *G06F 16/9024* (2019.01); *G06N 5/022* (2013.01)

(58) Field of Classification Search
CPC ...... G06N 20/00; G06N 5/022; G06N 99/005; G06F 16/288; G06F 16/9024; G06F 17/30604; G06F 17/30958
USPC ........................................................ 706/12
See application file for complete search history.

(56) References Cited

U.S. PATENT DOCUMENTS

| 9,129,433 B1 | 9/2015 | Korobkin | |
| 2003/0216855 A1* | 11/2003 | Liang | F01N 3/208 701/114 |
| 2011/0146683 A1* | 6/2011 | Jafari | A61B 5/085 128/204.21 |
| 2013/0096831 A1 | 4/2013 | Chan et al. | |
| 2013/0198740 A1* | 8/2013 | Arroyo | H04L 41/0806 718/1 |
| 2014/0025338 A1* | 1/2014 | Blount | G05B 23/0221 702/183 |
| 2014/0336966 A1 | 11/2014 | Kroupnova et al. | |
| 2015/0186777 A1* | 7/2015 | Lecue | G06N 5/025 706/12 |

(Continued)

OTHER PUBLICATIONS

Xu et al., "Scalable Cloud-Sensor Architecture for the Internet of Things", IEEE Internet of Things Journal, vol. 3, No. 3, Jun. 2016. (Year: 2016).*

(Continued)

*Primary Examiner* — Dave Misir
(74) *Attorney, Agent, or Firm* — Griffiths & Seaton PLLC

(57) ABSTRACT

Embodiments for using virtual sensor models in an internet of things (IoT) environment by a processor. One or more virtual sensor models are automatically identified according to a semantic graph, having a knowledge domain that links and describes a relationship between observed variables associated with one or more sensors with unobserved variables associated with the IoT environment. The one or more virtual sensor models may be selected for deployment in the IoT environment according to one or more combinations of virtual sensor inputs.

17 Claims, 13 Drawing Sheets

(56) References Cited

U.S. PATENT DOCUMENTS

2017/0115658 A1* 4/2017 Colt, Jr. ........... G05B 19/41875

OTHER PUBLICATIONS

Pfisterer et al., "SPITFIRE: Toward a Semantic Web of Things", IEEE Communications Magazine, Nov. 2011. (Year: 2011).*
Ploennigs et al., "Virtual sensors for estimation of energy consumption and thermal comfort in buildings with underfloor heating", Advanced Engineering Informatics 25 (2011) 688-698. (Year: 2011).*
Ploennigs et al., "Semantic Models for Physical Processes in CPS at the Example of Occupant Thermal Comfort" Jun. 2016. (Year: 2016).*
Ploennigs et al., "Wireless, Collaborative Virtual Sensors for Thermal Comfort", BuildSys 2010 Nov. 2, 2010, Zurich, Switzerland. (Year: 2010).*
Ploennigs et al., "Adapting Semantic Sensor Networks for Smart Building Diagnosis", ISWC 2014, Part II, LNCS 8797, pp. 308-323, 2014. (Year: 2014).*
Ploennigs et al., "BASont—A modular, adaptive Building Automation System Ontology", 2012 IEEE. (Year: 2012).*
Ploennigs et al., "Extending Semantic Sensor Networks for Automatically Tackling Smart Building Problems", ECAI 2014. (Year: 2014).*

* cited by examiner

AUTOMATIC IDENTIFICATION AND DEPLOYMENT OF VIRTUAL SENSOR MODELS

BACKGROUND OF THE INVENTION

Field of the Invention

The present invention relates in general to computing systems, and more particularly to, various embodiments for using virtual sensor models in an internet of things (IoT) environment using a computing processor.

Description of the Related Art

In today's society, consumers, businesspersons, educators, and others use various computing systems in a variety of settings. With the proliferation of computing systems, some computing systems may include control systems that may include and/or associate with one or more physical sensors. Physical sensors may be used in many computers, machines, and/or products to measure and monitor physical phenomena, such as lighting or temperature. Physical sensors may take direct measurements of the physical phenomena and convert these measurements into measurement data to be further processed by control systems. Although physical sensors take direct measurements of the physical phenomena, physical sensors and associated hardware are often costly and, sometimes, unreliable. Further, when control systems rely on physical sensors to operate properly, a failure of a physical sensor may render such control systems inoperable. Also, many physical sensors or virtual sensors are unable to measure other physical phenomena.

SUMMARY OF THE INVENTION

Various embodiments for automatically using virtual sensor models in an internet of things (IoT) environment by a processor, are provided. In one embodiment, by way of example only, a method for using virtual sensor models in an internet of things (IoT) environment, again by a processor, is provided. One or more virtual sensor models are automatically identified according to a semantic graph, having a knowledge domain that links and describes a relationship between observed variables associated with one or more sensors and unobserved variables associated with the IoT environment. The one or more virtual sensor models may be selected for deployment in the IoT environment according to one or more combinations of virtual sensor inputs.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
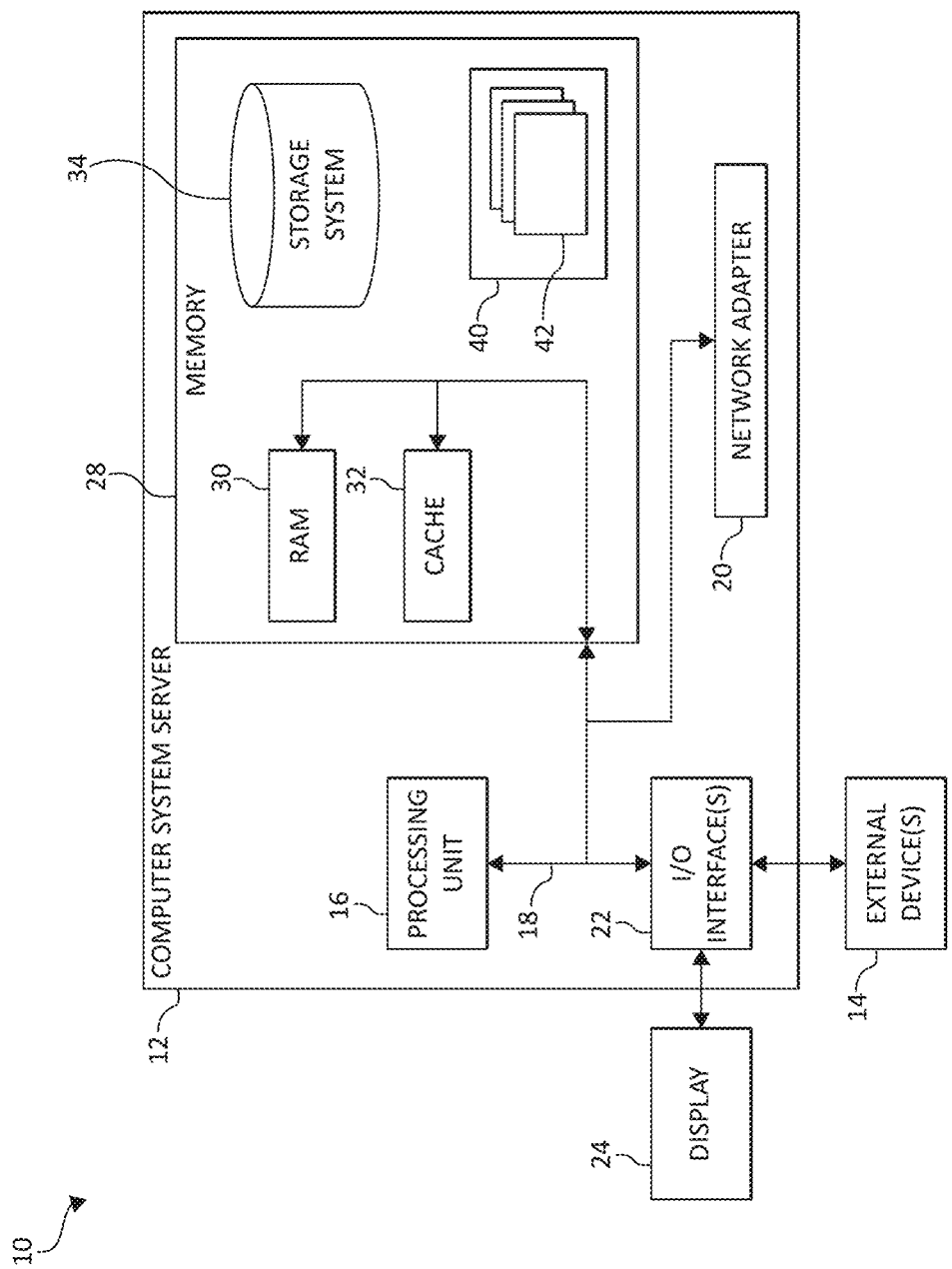
FIG. 1 is a block diagram depicting an exemplary cloud computing node according to an embodiment of the present invention.

As previously indicated, physical sensors may be used in many computers, machines, and/or products to measure and monitor physical phenomena, such as lighting or temperature. However, often times physical sensors may not be available in a desired location and/or have limited characteristics or performance capabilities, due to deployment difficulties, design, financial constraints, and/or sensor failures. Accordingly, one or more virtual sensors may be used to process other various physically measured values and to produce values that were previously measured directly by physical sensors. Virtual sensing (e.g., soft or proxy sensing) may include techniques used to provide feasible and economical alternatives to costly or unpractical physical measurement devices and sensor systems. In one aspect, a virtual sensor may estimate a non-existing sensor value (e.g., an undetected variable).

In one aspect, mechanisms of the illustrated embodiments provide a solution for using virtual sensors to identify one or more predictors, construct a predictive model at one or more locations, and/or configure a set of virtual sensor models. Automatic identification and deployment of one or more virtual sensor models may be performed in order to minimize human error, increase computing efficiency, improve scalability, and provide a solution to the failure of a physical sensor or a solution to circumstances in which physical sensors are unable to measure certain physical phenomena.

In one aspect, various embodiments for using virtual sensor models in an internet of things (IoT) environment by a processor, are provided. In one embodiment, by way of example only, a method for using virtual sensor models in an IoT environment, again by a processor, is provided. One or more virtual sensor models are automatically identified according to a semantic graph, having a knowledge domain that links and describes a relationship between observed variables associated with one or more sensors with unobserved variables associated with the IoT environment. The one or more virtual sensor models may be selected for deployment in the IoT environment according to one or more combinations of virtual sensor inputs.

As will be further described, the present invention automatically identifies and deploys virtual sensor models in an IoT environment (e.g., an edge or cloud computing environment) by detecting where virtual sensors can be extracted and applied. That is, present invention automatically identifies and deploys virtual sensor models for time series data using a graph model and graph patterns. In other words, the automatic learning and deployment of virtual sensors using a graph model and generic graph pattern may not only use one or more pre-specified and parameterized templates with fixed inputs, but may also utilize a knowledge domain in a semantic graph to deduce or extract where one or more virtual sensor models can be modelled as well as where the virtual sensor models can be deployed. The parameters of the models, and the type of virtual sensor, may be determined from the knowledge available in the graph. Upon detecting uncertainty in the graph, where more than one virtual sensor model may be applied, a statistical comparison operation is performed to identify the best matching model. Machine learning may be employed and a graph-matching operation may be used to automatically identify opportunities to train and deploy virtual sensor models. Such a graph matching operation identifies matches of generic graph patterns on the knowledge graph. For example, the graph pattern indicates that a virtual sensor can be trained where two physical sensors have a cause-effect relationship. The virtual sensor is matched against a knowledge graph that describes such cause-effect relationships. For each match a virtual sensor can be trained and stored in a virtual sensor database. The knowledge graph may contain additional information on the order of the cause-effect relationships which can be used to select the best fitting virtual sensor model, such as a linear model, a regressive model or a physical model.

Additionally, the virtual sensors may be applied and deployed to one or more locations by selecting from the database, such as a virtual sensor model database, a virtual sensor model according to user preference and/or application and deploy the virtual sensor models. One or more virtual sensor estimates may be produced and/or calculated. A diagram of sensing infrastructure of the location, where virtual sensor models are deployed, may also be provided, along with continuously provided recommendations for installation of one or more additional virtual sensors and physical sensors.

Moreover, virtual sensors may identify and detect one or more unobserved variables common to a system and store all the historical data on a distributed data base which may be used for identification of virtual sensor models. One or more virtual sensor models may be selected from the database using historical virtual sensor models from a same virtual sensor. The virtual sensors may link observed and unobserved sensors and automatically estimate virtual sensor values and a confidence level using applicability and variance of the one or more combinations of virtual sensor inputs. The applicability can be determined by means of statistical properties of the models (e.g. RMSE—root mean square error) as well as information from the knowledge graph (e.g. order of the cause effect relationship, number of inputs, etc.).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
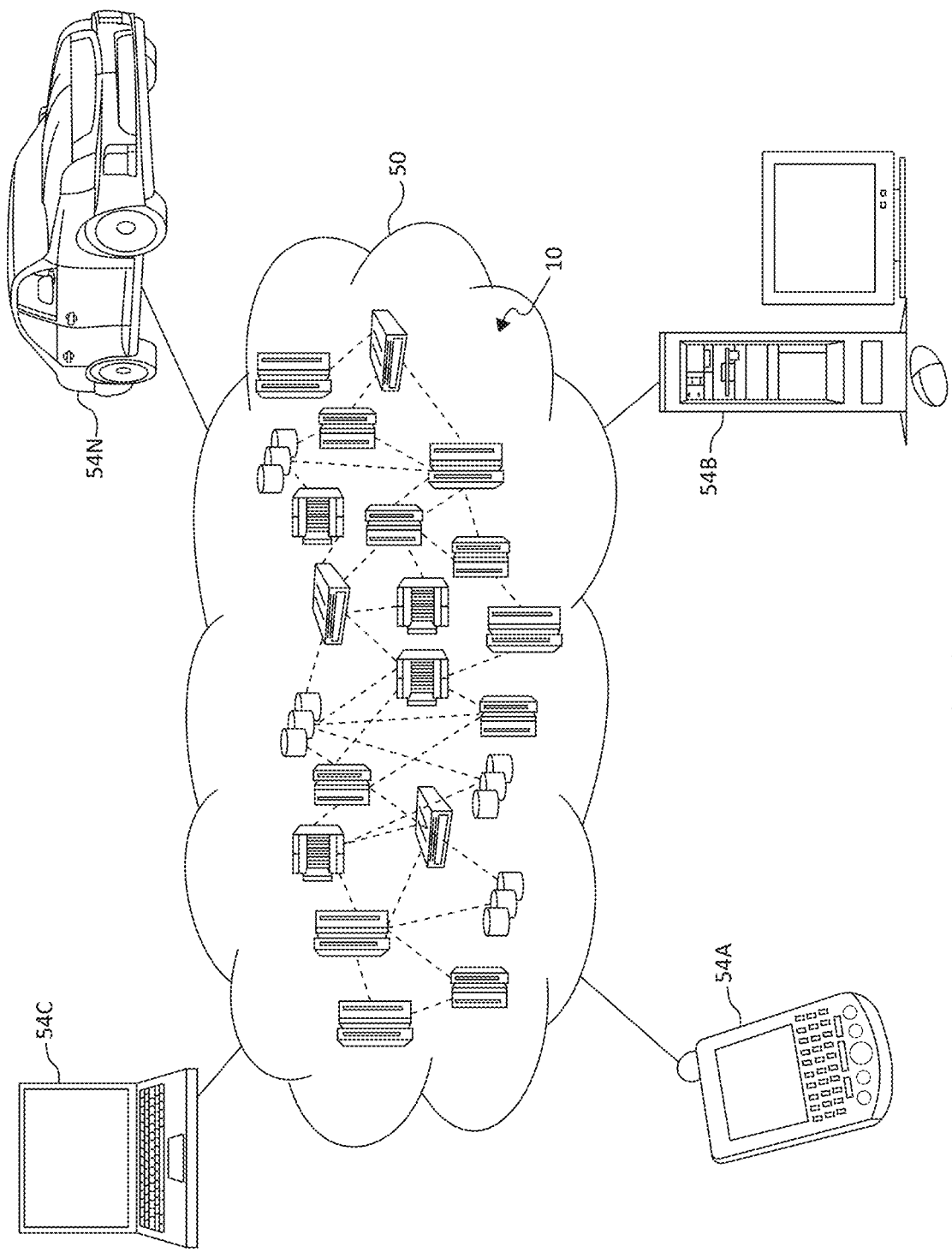
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
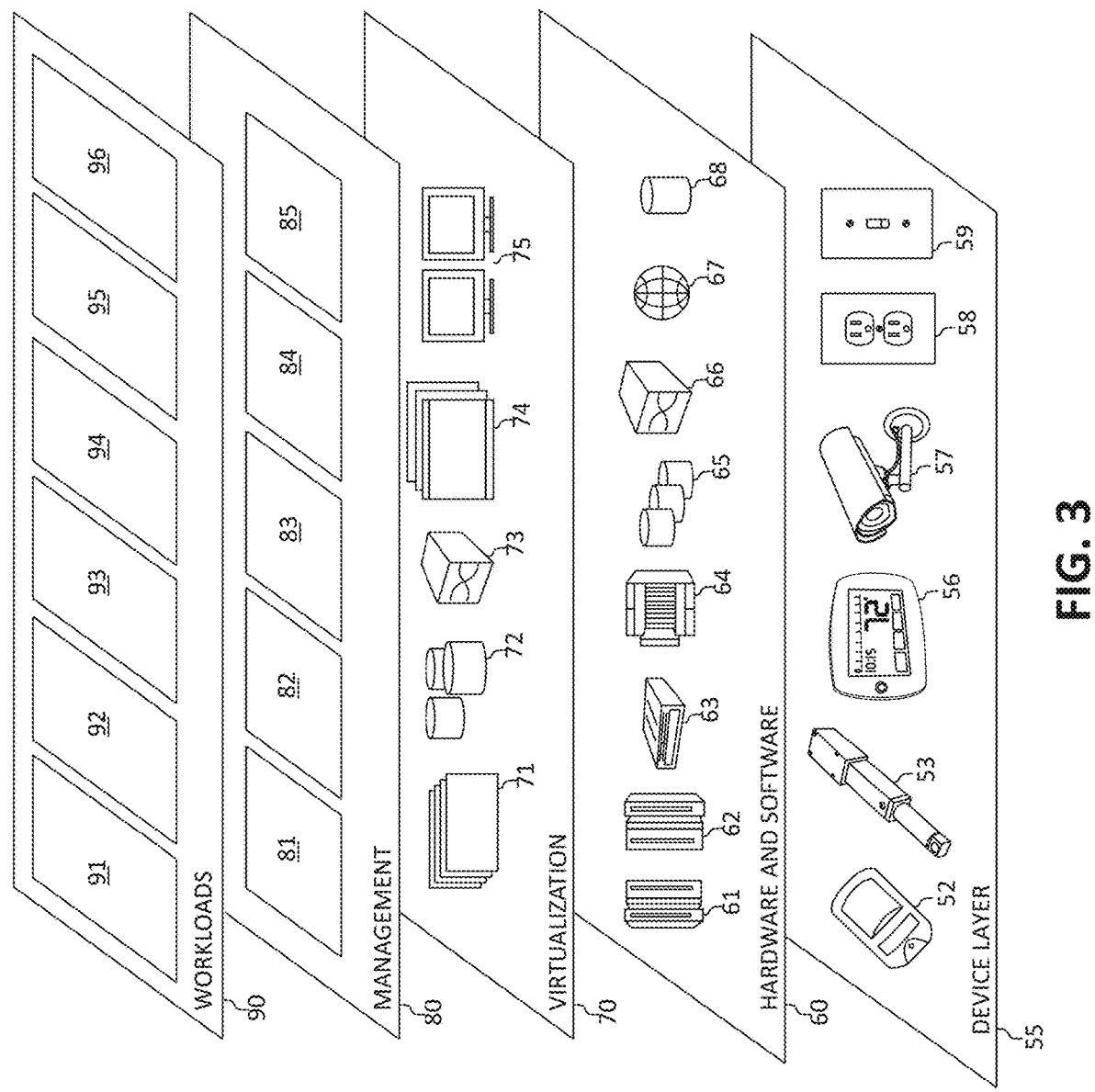
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various virtual sensor model workloads and functions 96. In addition, virtual sensor model workloads and functions 96 may include such operations as sensor data analytics, semantic graph creation and analysis, and as will be further described, virtual sensor module management functions. One of ordinary skill in the art will appreciate that the virtual sensor model workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
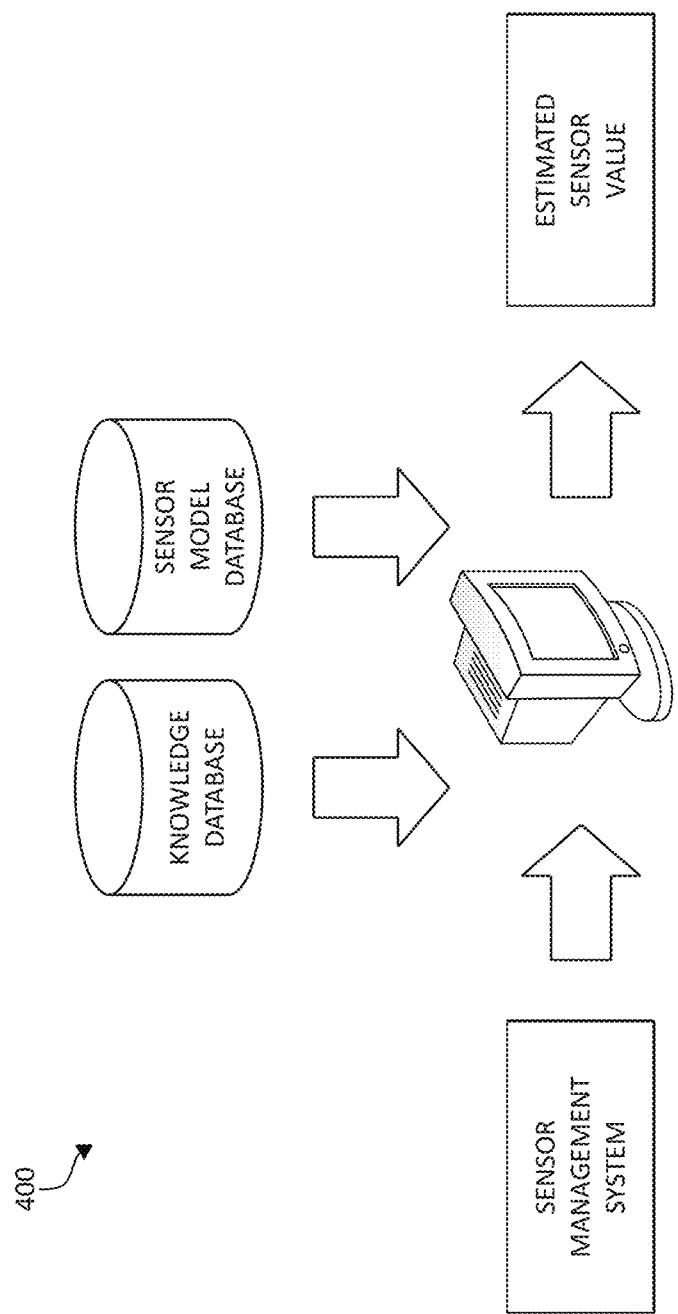
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments, is shown. Computer system/server 12 of FIG. 1 may be employed in FIG. 4, incorporating processing unit 16 to perform various computational, data processing and other functionality in accordance with various aspects of the present invention.

The functional components 400 may include a sensor management system, a knowledge database (e.g., a knowledge domain), a virtual sensor (e.g., "sensor") model database, which may work in communication with each other to produce and/or calculate an estimated sensor value. One or more virtual sensor models may be automatically identified according to a semantic graph, having a knowledge domain associated with the knowledge database that links and describes a relationship between observed variables associated with one or more sensors with unobserved variables associated with the sensor management system employed in an IoT environment. The one or more virtual sensor models may be selected from the sensor model database for deployment in the IoT environment according to one or more combinations of virtual sensor inputs. One or more virtual sensor values may be estimated by using the combination of virtual sensor inputs in one or more of the virtual sensor models.

In one aspect, the knowledge domain of the semantic graph may be an ontology of concepts representing a domain of knowledge. A thesaurus or ontology may be used as the domain knowledge and may also be used to identify semantic relationships between observed and/or unobserved variables. In one aspect, the term "domain" is a term intended to have its ordinary meaning. In addition, the term "domain" may include an area of expertise for a system or a collection of material, information, content and/or other resources related to a particular subject or subjects. For example, a domain can refer to physical phenomena, environmental, scientific, industrial, educational, statistical data, medical, and/or biomedical-specific information. A domain can refer to information related to any particular subject matter or a combination of selected subjects.

The term ontology is also a term intended to have its ordinary meaning. In one aspect, the term ontology in its broadest sense may include anything that can be modeled as ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

Figure 5:
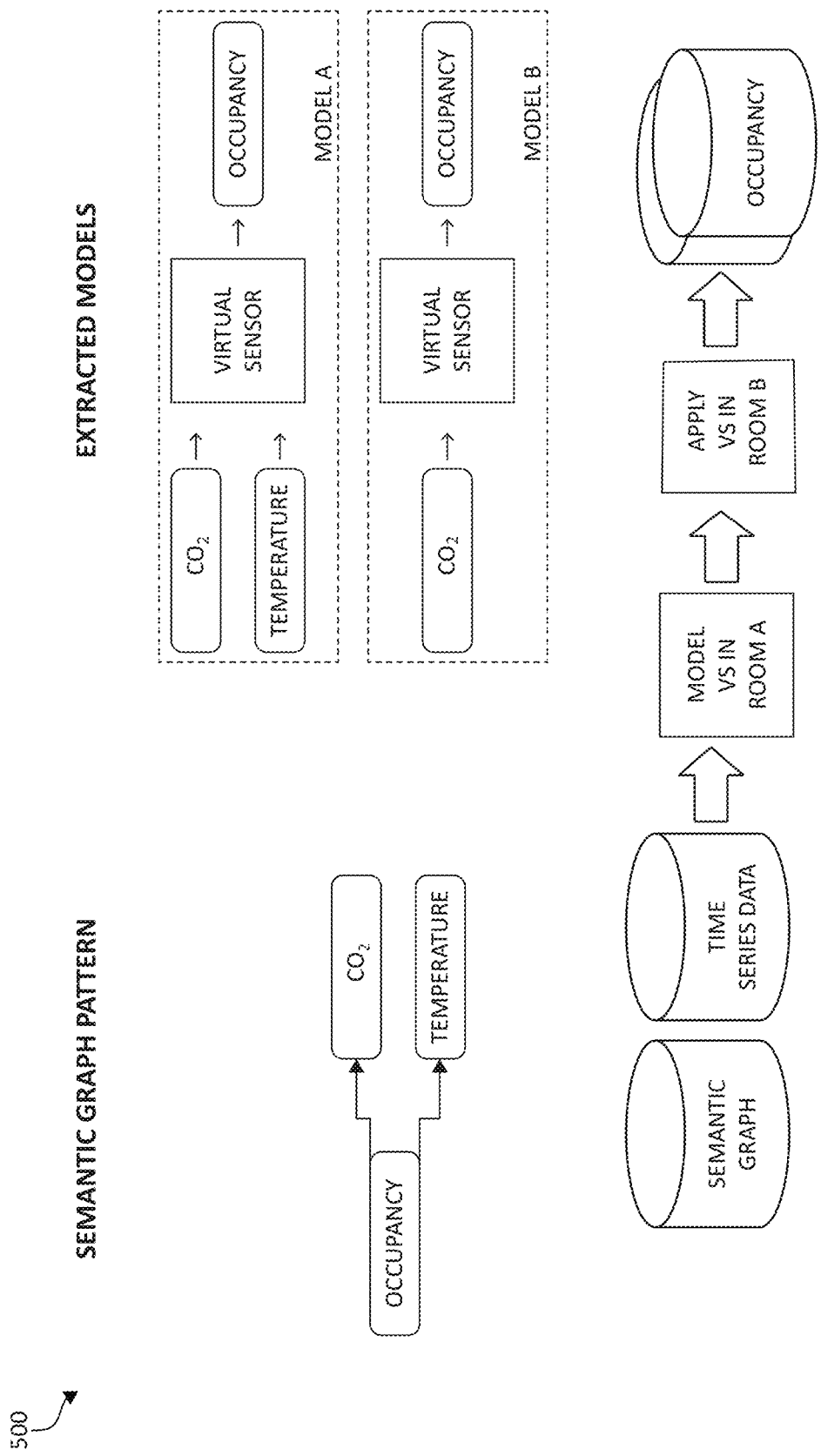
FIG. 5 is an additional block diagram depicting use of virtual sensor models in an internet of things (IoT) environment in which aspects of the present invention may be realized.

Turning now to FIG. 5, a block diagram of exemplary functionality 500 relating to use of virtual sensor models in an IoT environment is depicted. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIG. 4. With the foregoing in mind, the module blocks 500 may also be incorporated into various hardware and software components of a system for use of virtual sensor models in an IoT environment in accordance with the present invention. Many of the functional blocks 500 may execute as background processes on various components, either in distributed computing components, or on the user device, or elsewhere.

By way of example only, assume it is desired to determine the building occupancy in a desired location. However, given the cost and difficulty of deploying cameras for determining occupancy, the building occupancy may be estimated by using indirect measured information collected by one or more physical sensors such as, for example, carbon dioxide ($CO_2$) or temperature sensors. A relationship between observed variables may be described for and/or linked with unobserved variables. For example, as the observed variables of $CO_2$ and/or temperature increase, the unobserved variable of the number of occupants may be estimated to increase. Alternatively, as the $CO_2$ and/or temperature in a room decreases, the number of occupants may be estimated to also decrease. In other words, the virtual sensor may receive one or more inputs (e.g., $CO_2$ or temperature) to estimate a virtual sensor output (e.g., occupancy).

In one aspect, by way of example only, the use of virtual sensor models (such as the process of the example of FIG. 5) may include creating a semantic graph pattern that may model all physical relationships of time series data (e.g., the $CO_2$ and/or temperature data collected by a system over a selected period of time or "real time" data). The created semantic graph may link and describe (e.g., a physical relationship) between the observed variables, such as $CO_2$ and temperature detected by physical sensors, with unobserved variables, such as occupancy. For example, the physical relationship may describe the relationship (e.g., a positive correlation) between an increase in $CO_2$ and/or temperature and an amount of persons occupying the room. Simply stated, one variable (e.g., $CO_2$) may directly influence an alternative variable (e.g., occupancy). One or more virtual sensor models, such as virtual sensor module A and virtual sensor module B, may be extracted from a sensor module database, using the information of the semantic graph pattern and be applied in a selected location. For example, virtual sensor module A may include input terms $CO_2$ and temperature as virtual sensor inputs applied to a virtual sensor to produce a virtual sensor output parameter, which may be representative of occupancy. Alternatively, virtual sensor module B may include only the input term $CO_2$ as the virtual sensor input applied to a virtual sensor to produce a virtual sensor output parameter, which may be representative of occupancy. Machine learning may be employed to train and learn the virtual sensor models according to one or more various combinations of virtual sensor inputs.

In one aspect, the various functional units for learning and training one or more virtual models may apply one or more heuristics and machine learning based models using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back-propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure.

Figure 6:
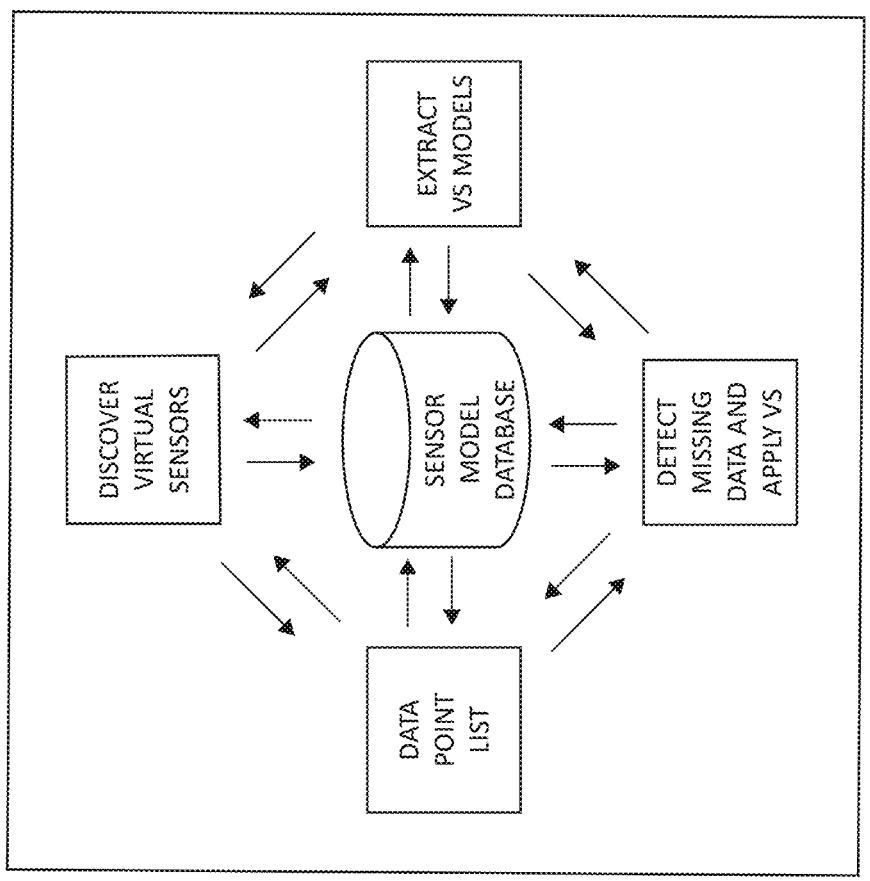
FIG. 6 is an additional block diagram depicting various user hardware and computing components for use of virtual sensor models in accordance with aspects of the present invention.

With the foregoing functional components 500 in view, consider some of the various aspects of the illustrated embodiments. FIG. 6 is an additional block diagram 600 depicting use of virtual sensor models in an IoT environment. In one aspect, a semantic graph may be collected from a selection of data points (e.g., a list of data points) from the one or more physical sensors or from the sensor model database to identify and/or detect one or more virtual sensors. Missing or non-existing data may be detected and the one or more virtual sensors may be used to "fill in" or provide the missing or non-existing data. At least one virtual sensor model may be extracted, such as from the sensor model database, for deployment in the IoT environment according to one or more combinations of virtual sensor inputs.

Figure 7:
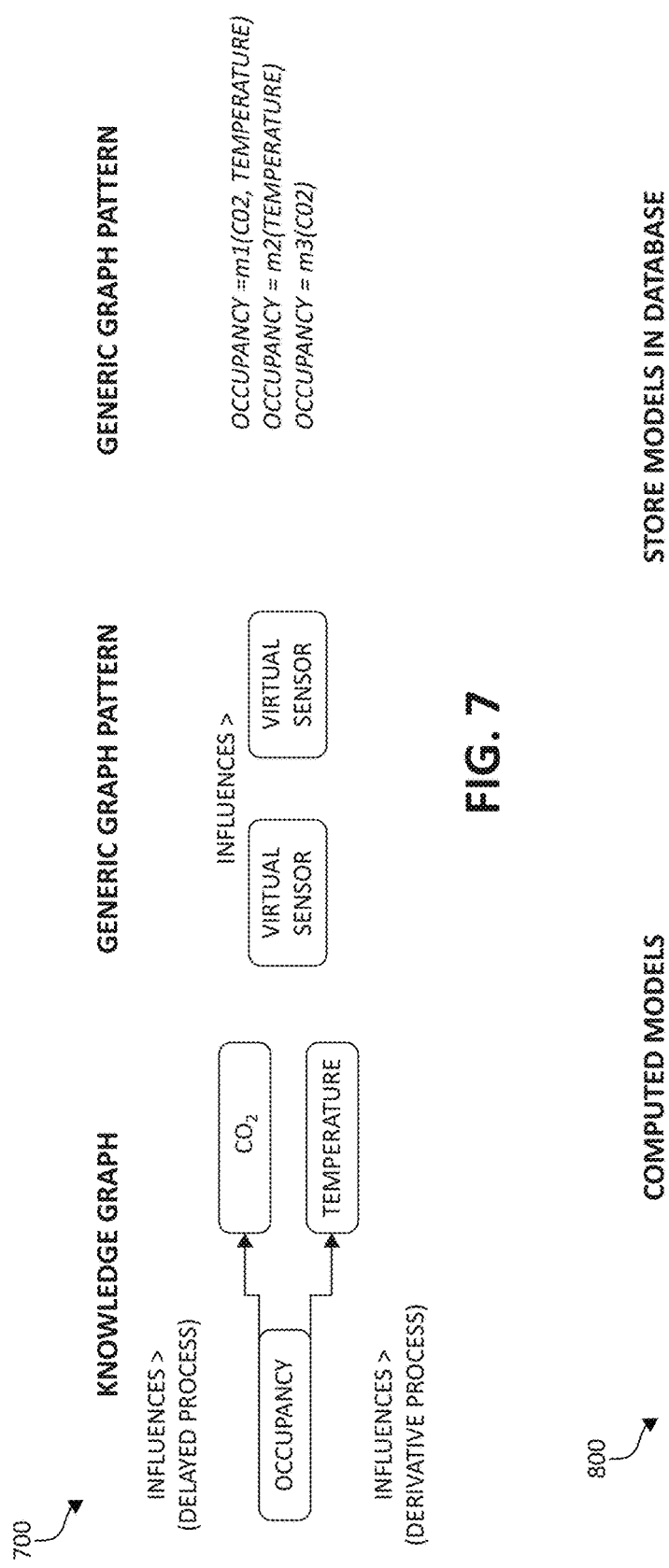
FIG. 7 is an additional block diagram depicting identification of opportunities for using virtual sensor models in an internet of things (IoT) environment in which aspects of the present invention may be realized.

With the foregoing functional components 500 and 600 in view, consider some of the various aspects of the illustrated embodiments using the same example of determining building occupancy. Turning now to FIG. 7 is a diagram depicting identification of opportunities for using virtual sensors in an IoT environment. In one aspect, a semantic knowledge graph may be created from a list of data points. In one aspect, the semantic knowledge graph may be automatically created and parameterized. A list of data points may be received, from sensors or a database, to be used to create the semantic knowledge graph. The semantic knowledge graph (or "knowledge graph") may be automatically created based on the received list of data points and data stored in a database and parameterizes the semantic knowledge graph. In one aspect, the selection of data points may be semantically annotated and semantic variables may be created that represent one or more variables and/or virtual sensor inputs.

In an additional aspect, the semantic knowledge graph may be automatically created by deriving a knowledge base from subject matter expertise. The knowledge base to extract one or more building characteristics from a point list of a building management system (BMS) that are not directly available from the BMS point list and a building energy management system (BEMS) may be configured using the one or more building characteristics extracted from the BMS point list.

That is, the semantic graph may be created by linking observed and unobserved sensors by a physical process model with spatial and system context. One or more virtual sensors may be determined by identifying unobserved variables common to locations and/or systems. Virtual sensor model inputs may be determined from the semantic knowledge graph using graph pattern matching. Different graph patterns can be used such as, for example, spatial relationships, aggregation hierarchies, physical process models linking explanatory variables. Depending on the semantic type of the involved sensors and the order of the cause-effect relationship, the best aggregation levels for such virtual sensors (which may be temporal: hour, day; spatial: room, floor, etc.) may also be automatically created. This allows to simultaneously learn, fuse, or apply virtual sensor models to various temporal or spatial levels, (e.g. for each room and floor).

In one aspect, the semantic knowledge graph describes a semantic function of each existing virtual sensor and links the existing virtual sensor to missing (if any) and/or non-existing sensors. A generic graph pattern may be used to determine and/or extract from the semantic knowledge graph locations for deploying the virtual sensor models. A matching operation may be executed on the virtual sensor models to determine one or more virtual sensor models that match. For example, one or more combinations of virtual sensor inputs may be identified as matching those data points that are used to determine common or similar virtual sensor output variables. For example, a first virtual sensor model ("m1") may use the virtual sensor input variables of $CO_2$ and temperature to determine occupancy. A second virtual sensor model ("m2") may use the virtual sensor input variable of temperature to determine occupancy. A third virtual sensor model ("m3") may use the virtual sensor input variable of $CO_2$ to determine occupancy. As such, virtual sensor models, such as M1, M2, and M3 may be identified as matching virtual sensor models given the various virtual sensor input variables used to determine a common virtual sensor output variable.

Figure 8:
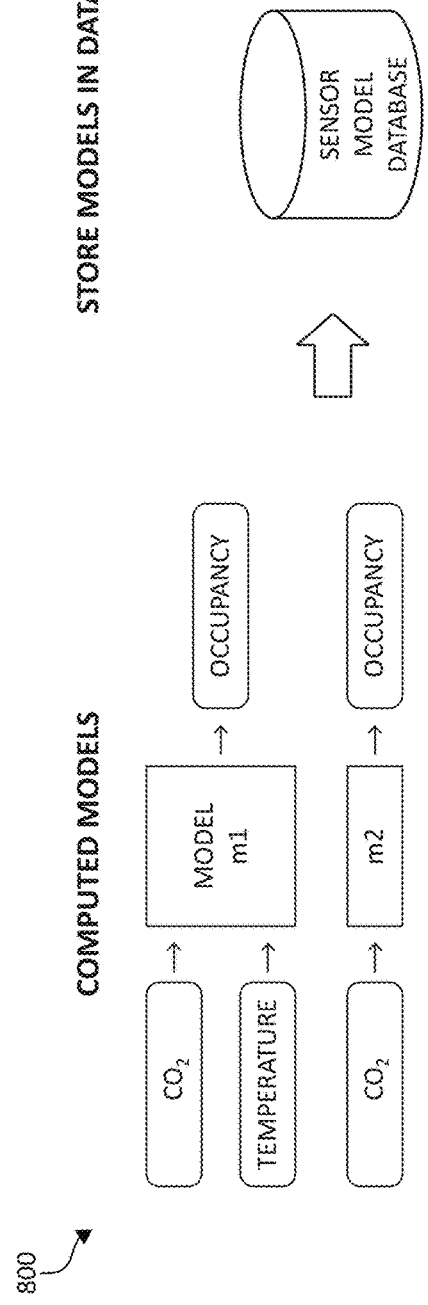
FIG. 8 is an additional block diagram depicting identification of virtual sensor models in an internet of things (IoT) environment in which aspects of the present invention may be realized.

Having identified an opportunity for learning a virtual sensor, FIG. 8 depicts a block diagram for identifying virtual sensor models in which aspects of the present invention. For each matching virtual sensor model, such as models M1, M2, and M3 of FIG. 7, a virtual sensor model may be computed by fitting a predictive model on the one or more combinations of virtual sensor input data, such as $CO_2$ and temperature. That is, one or more appropriate virtual sensor models may be automatically identified using a semantic knowledge in the semantic knowledge graph (such as proportional process, delayed process) or derived physical models. The one or more virtual sensor models may be trained using machine learning, historical data, and/or simulated sensor data. The one or more virtual sensor models may be stored in a database such as, for example, a sensor model database, which may be distributed.

Furthermore, the information given or provided by the semantic knowledge graph (see FIG. 7) may be used to select a most efficient predictive virtual sensor model. For example, the semantic knowledge graph may indicate that room temperature of a building depends on occupancy and may be determined using a derivative process or operation and a physical transient model may be used rather than a linear model, as illustrated in FIG. 9.

Figure 9:
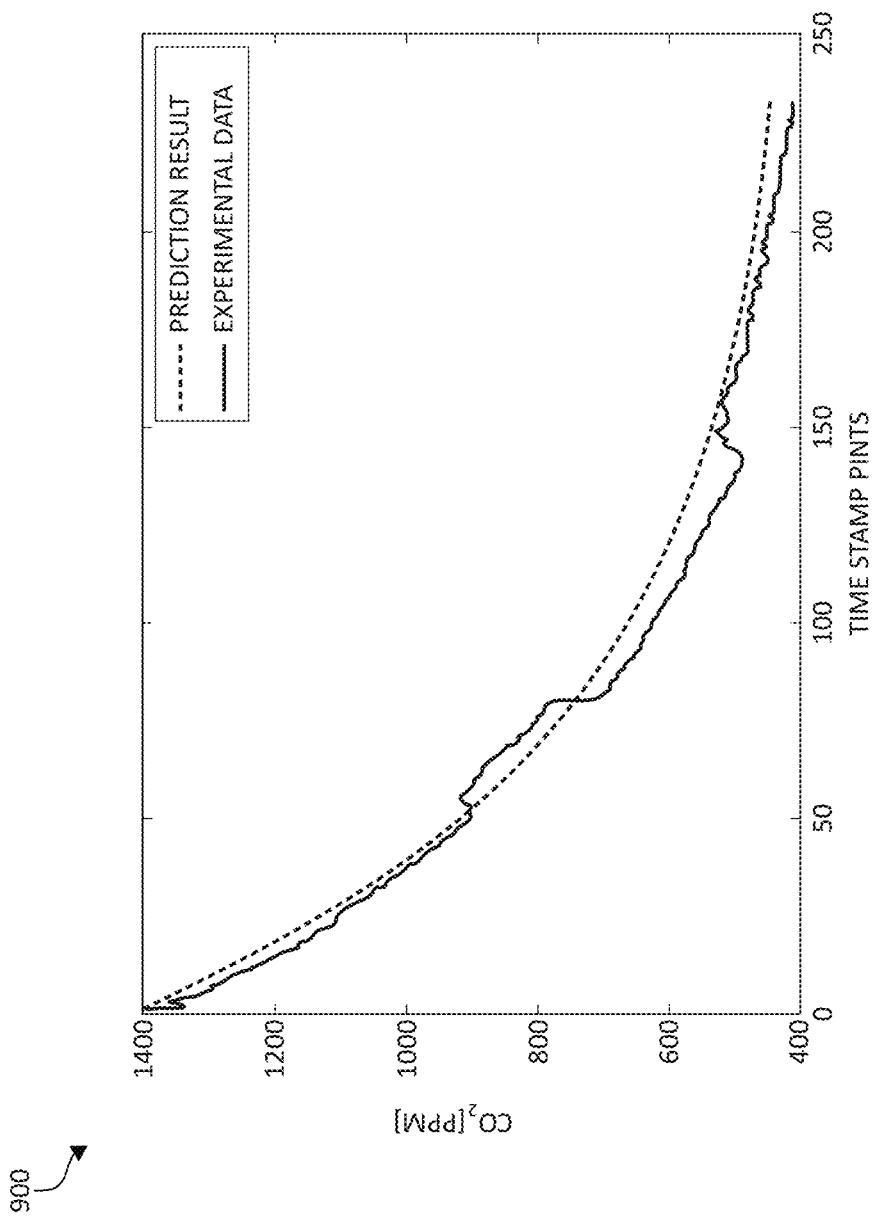
FIG. 9 is a graph diagram depicting a fitting curve of predicted data and experimental data relating to use of virtual sensor models in an internet of things (IoT) environment in which aspects of the present invention may be realized.

FIG. 9 is a graph 900 diagram depicting a fitting curve of predicted data and experimental data relating to use of virtual sensor models. Continuing with the example estimating building occupancy, FIG. 9 depicts estimating occupancy from the virtual sensor input variable of CO2 to determine occupancy. Since the semantic knowledge graph indicates that CO2 is derived from and/or depends on occupancy, the semantic knowledge graph link and/or describes a relationship between the observed variable of CO2 with the unobserved variable of occupancy using formula:

$$V_r C_r = m_{a,r}(C_a - C_r) + q_{CO2} p_{CO2} n_{OCC} \quad (1),$$

where $q_{CO2}$ is the CO2 emissions per person and/or known range parameters or variables, $p_{CO2}$ is the density of CO2, $m_{a,r}$ is the mass exchange outside and/or unknown parameters or unknown variables, OCC is occupancy (e.g., occupancy of a room or building), $n_{OCC}$ is a target variable, $C_a$, $C_r$–CO2 is the concentration of CO2 inside and/or outside of the room. Furthermore, a physical transient model solution may be provided for estimating the occupancy from CO2 with the unobserved variable of occupancy using formula:

$$n_{OCC}^C = \left(\frac{m_{a,r}}{q_{CO2} p_{CO2}}\right) * \left(\frac{C_r(t_1) - C_r(t_0) e^{-\frac{m_{a,r}}{V_r}T}}{1 - e^{-\frac{m_{a,r}}{V_r}T}} - C_a\right). \quad (2)$$

Figure 10:
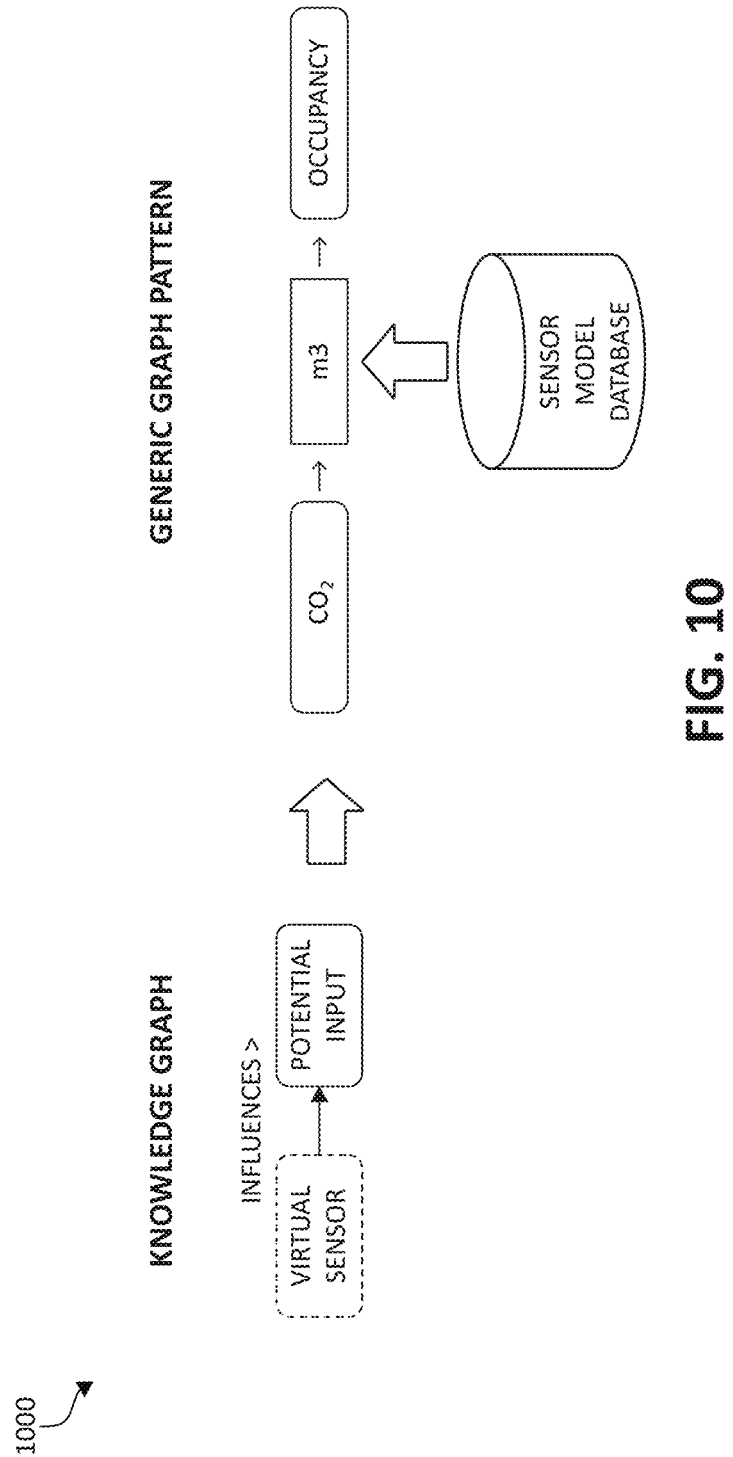
FIG. 10 is an additional block diagram depicting application of virtual sensor models in an internet of things (IoT) environment in which aspects of the present invention may be realized.

Turning to FIG. 10, an additional block diagram 1000 for application of virtual sensor models in an IoT environment is depicted. Generic graph patterns of virtual sensor inputs to virtual sensors may be applied to identify the locations of missing or non-existing sensors. A sensor model database may be searched for one or more stored virtual sensor models in the database. One or more stored virtual sensor models may be selected based on virtual sensor model parameters and accuracy assessment of the virtual sensor models in the database. The accuracy assessment may use knowledge of the archived RMSE during training or other model quality measurements. The accuracy assessment also may consider information from the knowledge graph such as the order of the relationship (proportional, delayed, etc.) or graph properties such as path length. Moreover, using FIG. 7, a continuous need for virtual sensors may be identified and selecting a most applicable virtual sensor model from a sensor model database according to one or more historical models from a same sensor (i.e. to interpolate missing values), aggregation hierarchies (e.g. energy consumption per floor), spatial similarity (e.g. neighbour room), virtual sensor input similarity (e.g. similar input data available), context similarity (e.g. similar building), and/or by automatically estimating virtual sensor values and estimating confidence level using applicability considering a subset or all of the above mentioned measurements used to estimate applicability.

Figure 11:
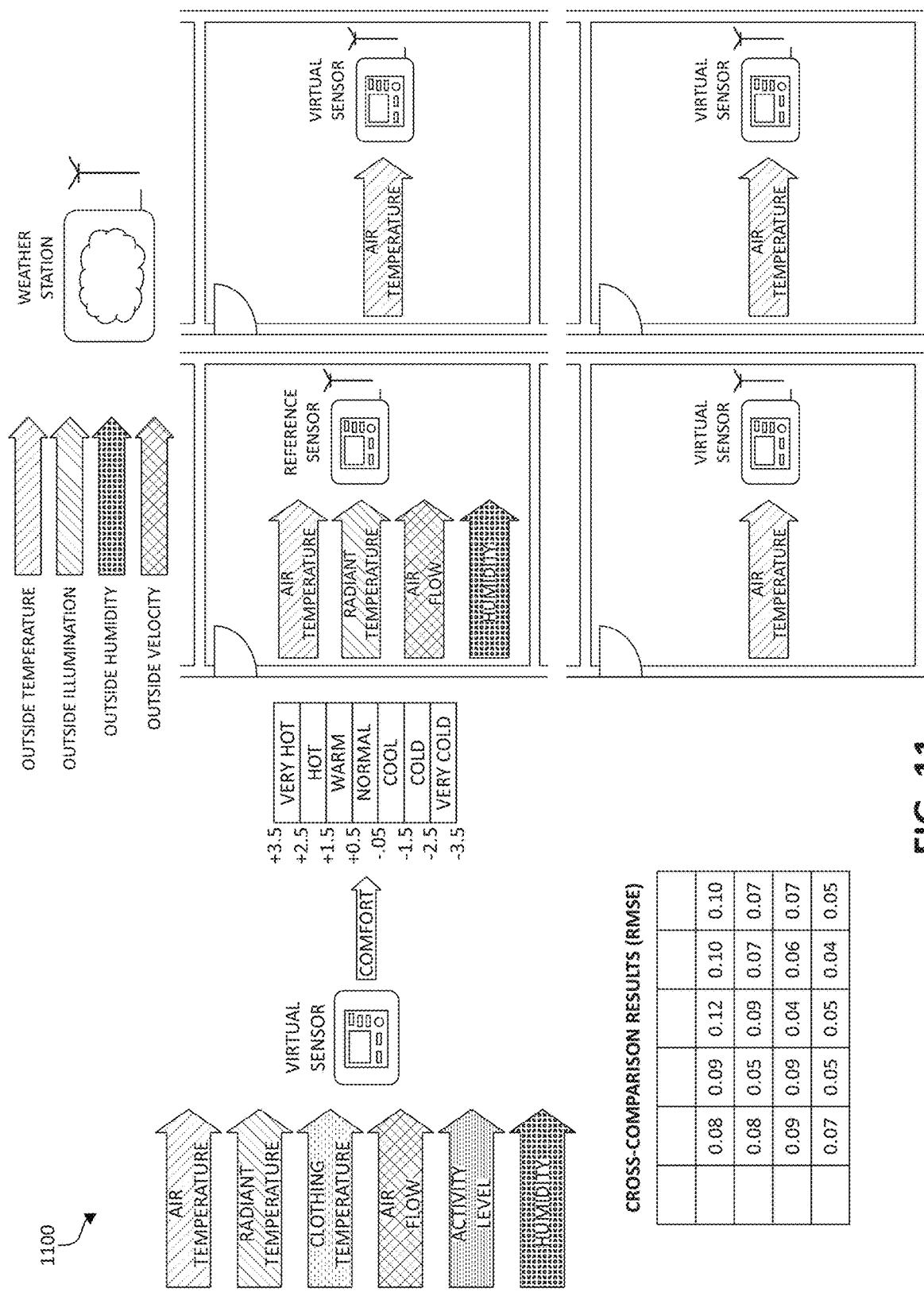
FIG. 11 is an additional block diagram depicting an exemplary example of applying the virtual sensor models in an internet of things (IoT) environment in which aspects of the present invention may be realized.

FIG. 11 is an additional block diagram 1100 that depicts an exemplary example of applying the virtual sensor models in an internet of things (IoT) environment. More specifically, FIG. 11 depicts using the present invention for determining thermal comfort. Thermal comfort can be a complex measurement that is difficult to measure due to the various influencing factors, such as, for example, air temperature, radiant temperature, clothing level, air flow, activity level, and/or humidity. Thermal comfort levels may range from very cold, cold, cool, normal, warm, hot, to very hot, such illustrated using the arbitrary values of −3.5 for very cold to +3.5 for very hot with −0.5 to +0.5 as a normal range. Accordingly, the present invention may use one or more virtual sensors, such as a weather station, reference sensors, and/or virtual sensors, that are equipped and/or deployed in multiple rooms of a building to train one or more virtual training modules. For example, a reference sensor may measure influencing factors of air temperature, radiant temperature, humidity, and/or airflow, the weather station may measure outside temperature, outside illumination, outside humidity, and/or outside air velocity. One or more virtual sensors may be deployed in one or more rooms and measure air temperature. A cross-comparison results (e.g. RMSE— root mean square error) table may be used to depict the various results and compare the quality of the various models to estimate the applicability of the models at other locations. A classification error may be used for applying a virtual sensor model trained with the data from one or more room per row and applied to the room per column with an average mean of 0.07 predictive mean vote (PMV).

Figure 12:
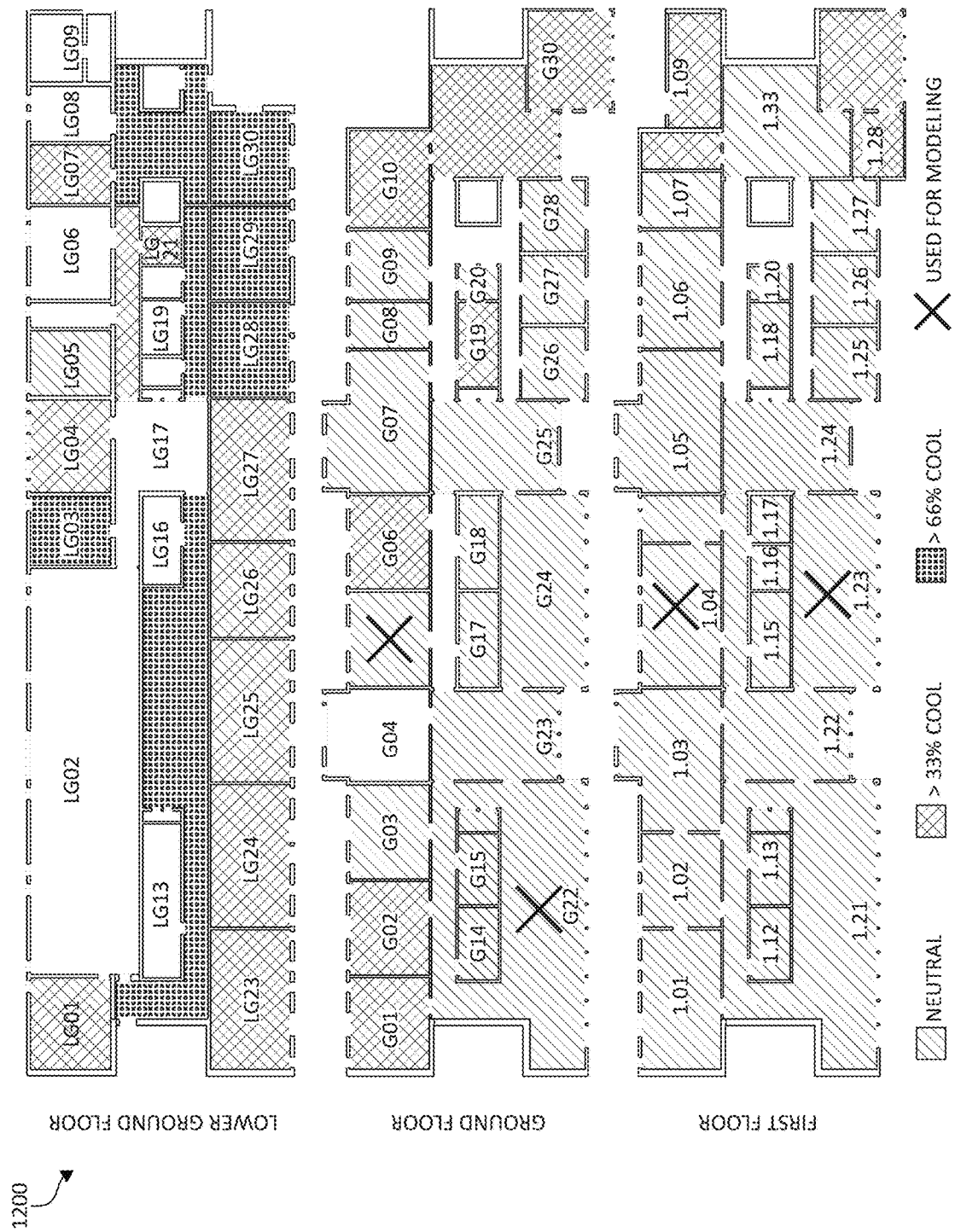
FIG. 12 is an additional block diagram depicting an exemplary example of applying the virtual sensor models in an internet of things (IoT) environment in which aspects of the present invention may be realized.

In an additional example, FIG. 12 depicts a diagram of applying virtual sensor models in an internet of things (IoT) environment for thermal comfort in which aspects of the present invention may be implemented. By applying the embodiments described herein, such as the thermal comfort example of FIG. 11, one or more virtual sensor models may be automatically applied to one or more different locations, such as different rooms of a building having a first floor (having rooms 1.01-1.33), a ground floor (having rooms G01-G30), and a lower ground floor (having rooms LG01-LG30). Assume now that 61 rooms include temperature sensors, 5 rooms may include both temperature and humidity sensors, and 3 rooms with temperature sensors and radiant temperature sensors. One or more virtual sensor models may be automatically identified according to a semantic graph, having a knowledge domain that links and describes a relationship between observed variables, associated with one or more sensors, with unobserved variables associated with the IoT environment. One or more virtual sensor models may be selected for deployment in the IoT environment according to one or more combinations of virtual sensor inputs. For example, one or more rooms may be identified as being cool 33 percent (%) of the time, neutral (e.g., a set temperature level as defined by a user, such as 70 degrees Fahrenheit), and/or one or more rooms are cool 66 percent of the time. One or more rooms may also be used for modeling.

In summary, the present invention provides a solution to automatically extracting and applying virtual sensors to, compute one or more virtual sensors, interpolate missing data, and estimate missing sensors in order to recommend where to place missing sensors to minimize sensor equipment. By creating a virtual sensor model database, the virtual sensor models may be shared in a cloud computing environment (e.g., between one or more buildings).

Figure 13:
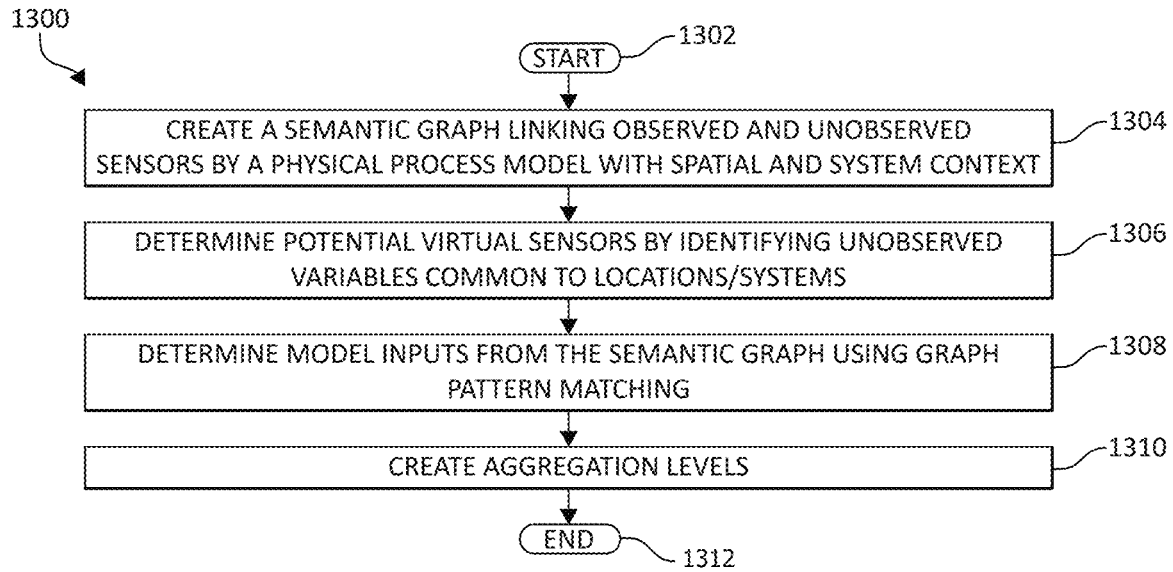
FIG. 13 is a flowchart diagram depicting an exemplary method for identification of opportunities for using virtual sensor models in an internet of things (IoT) environment in which aspects of the present invention may be realized.

Turning now to FIG. 13, a method 1300 for identification of opportunities for virtual sensors to be used in an IoT environment by a processor is depicted, in which various aspects of the illustrated embodiments may be implemented. That is, FIG. 13 is a flowchart of an additional example method 1300 for identification of opportunities for virtual sensors to be used to be employed in a computing environment according to an example of the present invention. The functionality 1300 may be implemented as a method executed as instructions on a machine, where the instructions are included on at least one computer readable medium or one non-transitory machine-readable storage medium. The functionality 1300 may start in block 1302. A semantic graph may be created linking observed and unobserved sensors by a physical process model with spatial and system context, as in block 1304. One or more virtual sensors (e.g., one or more potential virtual sensors) may be determined by identifying unobserved variables common to locations/systems, as in block 1306. One or more virtual sensor model inputs may be determined from the semantic graph using graph pattern matching, as in block 1308. One or more aggregation levels may be created, as in block 1310. The functionality 1300 may end, as in block 1312.

Figure 14:
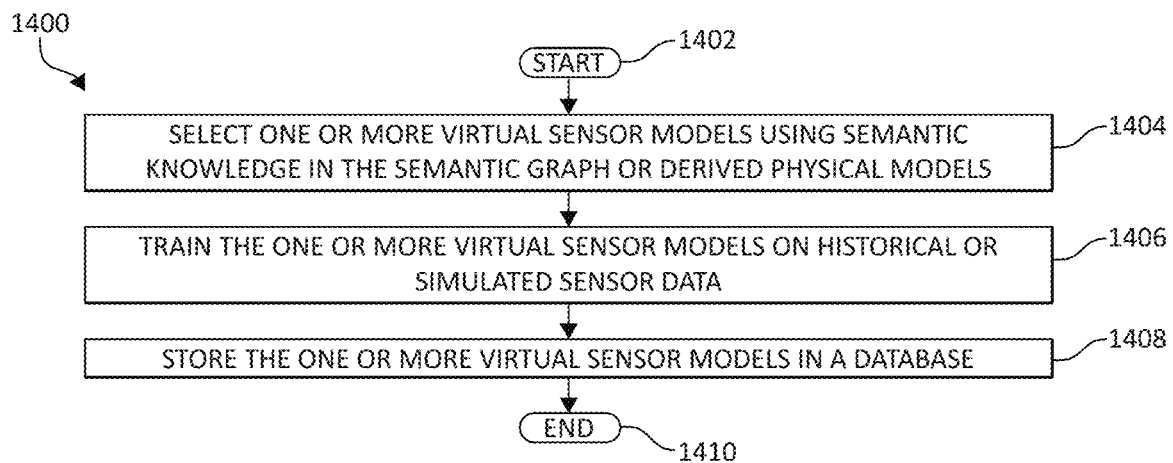
FIG. 14 is a flowchart diagram depicting an exemplary method for identification of virtual sensor models in an internet of things (IoT) environment in which aspects of the present invention may be realized.

Turning now to FIG. 14, a method 1400 for identification of virtual sensor models by a processor is depicted, in which various aspects of the illustrated embodiments may be implemented. That is, FIG. 14 is a flowchart of an additional example method 1400 for identification of virtual sensor models in a computing environment according to an example of the present invention. The functionality 1400 may be implemented as a method executed as instructions on a machine, where the instructions are included on at least one computer readable medium or one non-transitory machine-readable storage medium. The functionality 1400 may start in block 1402. One or more virtual sensor models may be selected using semantic knowledge in the semantic graph or derived physical models, as in block 1404. The one or more virtual sensor models may be trained on historical or simulated sensor data, as in block 1406. The one or more virtual sensor models may be stored in a database, as in block 1408. The functionality 1400 may end, as in block 1410.

Figure 15:
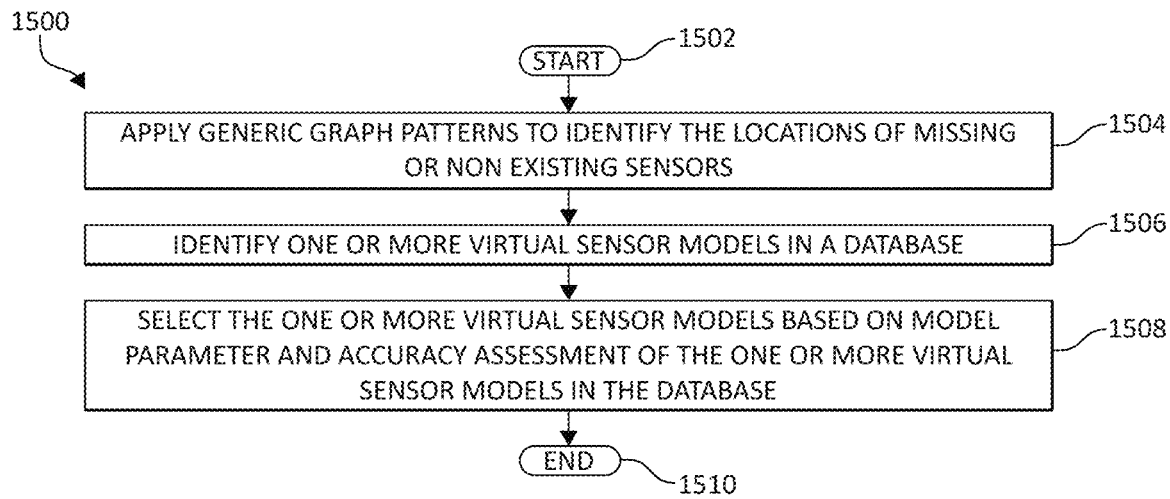
FIG. 15 is a flowchart diagram depicting an exemplary method for applying virtual sensor models in an internet of things (IoT) environment in which aspects of the present invention may be realized.

Turning now to FIG. 15, a method 1500 for application of virtual sensor models by a processor is depicted. That is, FIG. 15 is a flowchart of an additional example method 1500 for application of virtual sensor models in a computing environment. The functionality 1500 may be implemented as a method executed as instructions on a machine, where the instructions are included on at least one computer readable medium or one non-transitory machine-readable storage medium. The functionality 1500 may start in block 1502. One or more generic graph patterns may be applied to identify the locations of missing or non-existing sensors, as in block 1504. One or more virtual sensor models may be identified in a database, as in block 1506. One or more virtual sensor models may be selected based on model parameter and accuracy assessment of the one or more virtual sensor models in the database, as in block 1508. The functionality 1500 may end, as in block 1510.

Figure 16:
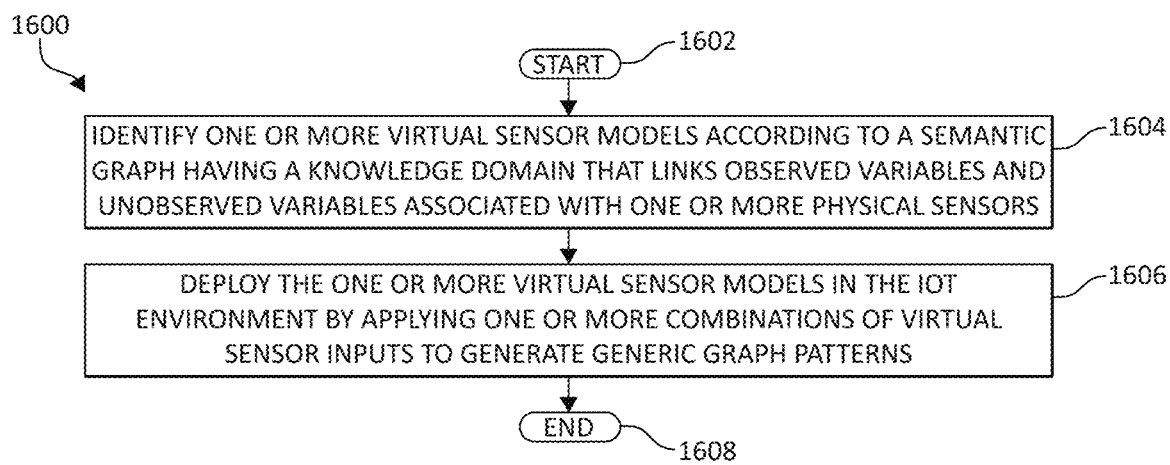
FIG. 16 is a flowchart diagram depicting an exemplary method for using virtual sensor models in an internet of things (IoT) environment in which aspects of the present invention may be realized.

Turning now to FIG. 16, a method 1600 for use of virtual sensor models in an IoT by a processor is depicted, in which various aspects of the illustrated embodiments may be implemented. The functionality 1600 may be implemented as a method executed as instructions on a machine, where the instructions are included on at least one computer readable medium or one non-transitory machine-readable storage medium. The functionality 1600 may start in block 1602. One or more virtual sensor models may be identified according to a semantic graph having a knowledge domain that links observed variables and unobserved variables associated with one or more physical sensors, as in block 1604. The one or more virtual sensor models may be deployed in the IoT environment by applying one or more combinations of virtual sensor inputs to generate generic graph patterns, as in block 1606. The functionality 1600 may end, as in block 1608.

In one aspect, in conjunction with and/or as part of at least one block of FIG. 16, the operation of 1600 may include each of the following. The operation of 1600 may include creating the semantic graph from a selection of data points from the one or more sensors or a database and identifying those of the one or more virtual sensor models having a graph pattern that match at least one of the one or more combinations of virtual sensor inputs. The operation of 1600 may apply graph patterns of the one or more combinations of virtual sensor inputs to the one or more virtual sensor models to identify locations for the deployment. The one or more virtual sensor models may be trained according to historical data or simulated sensor data using machine learning. The one or more virtual sensor models stored in a database may be selected utilizing the semantic graph or applying a predictive model to the one or more combinations of virtual sensor inputs. The operation of 1600 may also include estimating virtual sensor model output values and confidence levels for each one of the one or more virtual sensor models according to applicability and variance of the one or more combinations of virtual sensor inputs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for using virtual sensor models in an internet of things (IoT) environment, comprising:
   automatically identifying one or more virtual sensor models according to a semantic graph, having a knowledge domain that links and describes a relationship between observed variables associated with one or more physical sensors with unobserved variables associated with the IoT environment; wherein the one or more virtual sensor models use virtual sensor inputs of one or more virtual sensors to deduce values estimated as undetected variables that otherwise would be produced by the one or more physical sensors;
   selecting the one or more virtual sensor models for deployment in the IoT environment according to one or more combinations of the virtual sensor inputs; wherein the selecting further includes automatically recommending locations for the deployment of the one or more virtual sensors in the IoT environment based on an indication that the one or more virtual sensor models are able to train the one or more virtual sensors at a perspective location according to a cause-effect relationship of at least two of the one or more physical sensors in a vicinity of the perspective location; and
   commensurate with selecting the one or more virtual sensor models for deployment, linking the observed variables and the unobserved variables to estimate virtual sensor model output values and confidence levels for each one of the one or more virtual sensor models; wherein the estimated output values and confidence levels identify an applicability and variance of the one or more combinations of the virtual sensor inputs to each of the recommended locations for the deployment.

2. The method of claim 1, further including creating the semantic graph from a selection of data points from the one or more physical sensors or a database.

3. The method of claim 1, further including identifying those of the one or more virtual sensor models having a graph pattern that match at least one of the one or more combinations of the virtual sensor inputs.

4. The method of claim 1, further including applying graph patterns of the one or more combinations of the virtual sensor inputs to the one or more virtual sensor models to identify the locations for the deployment.

5. The method of claim 1, further including training the one or more virtual sensor models according to historical data or simulated sensor data using machine learning.

6. The method of claim 5, further including selecting the one or more virtual sensor models stored in a database utilizing the semantic graph or applying a predictive model to the one or more combinations of the virtual sensor inputs.

7. A system for using virtual sensor models in an internet of things (IoT) environment, comprising:
   a processor, operational within and between a distributed computing environment, that
      automatically identifies one or more virtual sensor models according to a semantic graph, having a knowledge domain that links and describes a relationship between observed variables associated with one or more physical sensors with unobserved variables associated with the IoT environment; wherein the one or more virtual sensor models use virtual sensor inputs of one or more virtual sensors to deduce values estimated as undetected variables that otherwise would be produced by the one or more physical sensors;
      selects the one or more virtual sensor models for deployment in the IoT environment according to one or more combinations of the virtual sensor inputs; wherein the selecting further includes automatically recommending locations for the deployment of the one or more virtual sensors in the IoT environment based on an indication that the one or more virtual sensor models are able to train the one or more virtual sensors at a perspective location according to a cause-effect relationship of at least two of the one or more physical sensors in a vicinity of the perspective location; and
      commensurate with selecting the one or more virtual sensor models for deployment, links the observed variables and the unobserved variables to estimate virtual sensor model output values and confidence levels for each one of the one or more virtual sensor models; wherein the estimated output values and confidence levels identify an applicability and variance of the one or more combinations of the virtual sensor inputs to each of the recommended locations for the deployment.

8. The system of claim 7, wherein the processor creates the semantic graph from a selection of data points from the one or more physical sensors or a database.

9. The system of claim 7, wherein the processor identifies those of the one or more virtual sensor models having a graph pattern that match at least one of the one or more combinations of the virtual sensor inputs.

10. The system of claim 7, wherein the processor applies graph patterns of the one or more combinations of the virtual sensor inputs to the one or more virtual sensor models to identify the locations for the deployment.

11. The system of claim 7, wherein the processor trains the one or more virtual sensor models according to historical data or simulated sensor data using machine learning.

12. The system of claim 7, wherein the processor selects the one or more virtual sensor models stored in a database utilizing the semantic graph or applying a predictive model to the one or more combinations of the virtual sensor inputs.

13. A computer program product for, by a processor, using virtual sensor models in an internet of things (IoT) environment, the computer program product comprising a non-transitory computer-readable storage medium having computer-readable program code portions stored therein, the computer-readable program code portions comprising:
   an executable portion that automatically identifies one or more virtual sensor models according to a semantic graph, having a knowledge domain that links and describes a relationship between observed variables associated with one or more physical sensors with unobserved variables associated with the IoT environment; wherein the one or more virtual sensor models use virtual sensor inputs of one or more virtual sensors to deduce values estimated as undetected variables that otherwise would be produced by the one or more physical sensors;
   an executable portion that selects the one or more virtual sensor models for deployment in the IoT environment according to one or more combinations of the virtual sensor inputs; wherein the selecting further includes automatically recommending locations for the deployment of the one or more virtual sensors in the IoT environment based on an indication that the one or more virtual sensor models are able to train the one or more virtual sensors at a perspective location according to a cause-effect relationship of at least two of the one or more physical sensors in a vicinity of the perspective location; and
   an executable portion that, commensurate with selecting the one or more virtual sensor models for deployment, links the observed variables and the unobserved variables to estimate virtual sensor model output values and confidence levels for each one of the one or more virtual sensor models; wherein the estimated output values and confidence levels identify an applicability and variance of the one or more combinations of the virtual sensor inputs to each of the recommended locations for the deployment.

14. The computer program product of claim 13, further including an executable portion that creates the semantic graph from a selection of data points from the one or more physical sensors or a database.

15. The computer program product of claim 13, further including an executable portion that:
   identifies those of the one or more virtual sensor models having a graph pattern that match at least one of the one or more combinations of the virtual sensor inputs; and
   applies graph patterns of the one or more combinations of the virtual sensor inputs to the one or more virtual sensor models to identify the locations for the deployment.

16. The computer program product of claim 13, further including an executable portion that trains the one or more virtual sensor models according to historical data or simulated sensor data using machine learning.

17. The computer program product of claim 13, further including an executable portion that selects the one or more virtual sensor models stored in a database utilizing the semantic graph or applying a predictive model to the one or more combinations of the virtual sensor inputs.

\* \* \* \* \*